US009806965B2

(12) United States Patent
Free et al.

(10) Patent No.: US 9,806,965 B2
(45) Date of Patent: Oct. 31, 2017

(54) AUTOMATIC USER REDUNDANCY DETERMINATION

(75) Inventors: James Douglas Free, Thornton, CO (US); Kenneth Owen Michie, Thornton, CA (US); Chandra Mouli Ravipati, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 649 days.

(21) Appl. No.: 12/893,143

(22) Filed: Sep. 29, 2010

(65) Prior Publication Data

US 2012/0076129 A1 Mar. 29, 2012

(51) Int. Cl.
*H04L 12/24* (2006.01)
*H04L 29/14* (2006.01)
*H04L 29/06* (2006.01)

(52) U.S. Cl.
CPC .......... *H04L 41/5054* (2013.01); *H04L 69/40* (2013.01); *H04L 65/1006* (2013.01)

(58) Field of Classification Search
CPC ......... H04L 29/12066; H04L 29/12641; H04L 61/1511; H04L 61/3025; H04L 65/1006; H04L 65/1016; H04L 41/5054; H04L 69/40
USPC .................. 370/352, 356, 338; 709/227, 228
See application file for complete search history.

(56) References Cited

U.S. PATENT DOCUMENTS

| | | | |
|---|---|---|---|
| 2005/0009520 A1* | 1/2005 | Herrero et al. ............ 455/435.1 |
| 2006/0182255 A1* | 8/2006 | Luck et al. .............. 379/220.01 |
| 2007/0076696 A1* | 4/2007 | An et al. ........................ 370/352 |
| 2009/0092061 A1* | 4/2009 | Shen ............................ 370/254 |
| 2009/0245098 A1* | 10/2009 | Baker et al. .................. 370/221 |
| 2009/0245183 A1* | 10/2009 | Baker et al. .................. 370/329 |
| 2009/0245492 A1* | 10/2009 | Baker et al. ............. 379/112.01 |
| 2009/0265543 A1* | 10/2009 | Khetawat et al. ............ 713/151 |

(Continued)

FOREIGN PATENT DOCUMENTS

| | | |
|---|---|---|
| EP | 2197169 | 6/2010 |
| GB | 2463342 | 3/2010 |

OTHER PUBLICATIONS

Search Report for United Kingdom Patent Application No. GB1116752.5, dated Jan. 23, 2012 4 pages.

*Primary Examiner* — Khaled Kassim
(74) *Attorney, Agent, or Firm* — Sheridan Ross P.C.

(57) ABSTRACT

The embodiments presented herein provide an automated process for provisioning a user in a communication system. A session manager, which can be a server in the communication system that provides call connection and routing, may receive registration request from communication device (e.g. a cellular telephone, an IP-enabled phone, etc.). The session manager may determine one or more characteristics about the communication device and/or determine a load on one or more other session managers in a cluster of session managers. Based on both the communication device characteristics and/or the loads on the two or more session managers, the session manager can determine a set of session managers, which may include a primary session manager and a secondary session manager, which can manage the user data for the communication device. This session manager set information may then be sent to the communication device and to other session managers in the cluster. The set of session managers may then manage the user data for the communication device.

19 Claims, 8 Drawing Sheets

(56) References Cited

U.S. PATENT DOCUMENTS

| | | | |
|---|---|---|---|
| 2009/0282137 A1* | 11/2009 | Qiu et al. | 709/223 |
| 2010/0017527 A1* | 1/2010 | Kinoshita et al. | 709/230 |
| 2010/0070563 A1* | 3/2010 | Baker et al. | 709/203 |
| 2010/0074154 A1* | 3/2010 | Astr m et al. | 370/310 |
| 2010/0177766 A1* | 7/2010 | daCosta et al. | 370/352 |
| 2010/0217875 A1* | 8/2010 | Belinchon Vergara et al. | 709/228 |
| 2011/0142015 A1* | 6/2011 | Shaikh et al. | 370/338 |

* cited by examiner

AUTOMATIC USER REDUNDANCY DETERMINATION

BACKGROUND

User data is important to the proper functioning of call communication systems. Providing back-ups of the user data ensures that important user data is not lost during partial system outages or that the user sees minimal, if any, degradation in service during the outages. Unfortunately, establishing redundancy in communication systems is difficult. Often, the redundancies between two or more call servers is manually created and managed. Thus, the current model of redundancy establishment forces the administrator to input a primary and secondary server relationship, for every single user that is provisioned in the communication system. When systems reach capacities of thousands of users, this manual process is a severe burden on the administrator. Not only does the administrator have to manually decide this primary/secondary server relationship for each user, but the administrator must maintain a mental model of how the communication system is provisioned to ensure proper load balancing. Should the communication system add a new server to the core, the administrator is required to re-provision all existing users and decide how to rebalance the system. This difficulty in rebalancing can inhibit system expansion and prevent the better utilization of current and new servers in the communication system.

SUMMARY

The embodiments presented herein provide an automated process for provisioning a user in a communication system. A session manager, which can be a server in the communication system that provides call connection and routing, may receive a registration request from communication device (which is defined below). The session manager may determine one or more characteristics about the communication device and/or determine a load on one or more other session managers in a cluster of session managers. Based on both the communication device characteristics and/or the loads on the two or more session managers, the session manager can determine at least a set of session managers, which includes a primary session manager and a secondary session manager, that will manage the user data for the communication device. This session manager set information may then be sent to the communication device and to the session managers in the cluster. The set of session managers may then manage the user data for the communication device.

In embodiments, the process has three phases: 1) initial registration balancing; 2) re-registration balancing; and 3) un-registration notification. In initial registration balancing, the administrator provisions the user without choosing a primary/secondary set of session managers that will manage the user's data. Rather, the redundancy is handled implicitly. The recently provisioned user becomes known across the session managers in a cluster. Generally, a user has a default proxy setting in their phone to determine to which default session manager to contact for the initial service request. The phone user logs in to the phone with their credentials, and a Session Initiation Protocol (SIP) REGISTER message is sent to the default session manager server. The session manager receives the initial registration request and determines the redundancy sets based on at least two main considerations: 1) the user's characteristics (e.g., the user's physical location (based on the originating Internet Protocol (IP) address), the user's provisioned settings, etc.); and 2) the characteristics of the session managers in the cluster (e.g., the current load on each of the session managers in the cluster, the current user redundancy mappings, the features provided by the session managers, etc.). Generally, the goal of determining the redundancy sets is to spread out user redundancy mappings while finding a set of session managers that is best suited geographically for that user.

Depending on the characteristics, the default session manager may accept the registration or indicate, to the user, which session manager redundancy sets to use (i.e., by sending the information in the SIP 301 back to the user). Further, information about this particular user's redundancy sets can be made known across the cluster of session managers. Thus, should the user be redirected to another pair of session managers, the user can register with the suggested session managers and be immediately accepted as a result of the recently broadcast redundancy information for the user.

In the re-registration balancing process, the redundancy sets for one or more users may be changed. Periodically, registered phones can re-register to the phone's associated primary and secondary session managers to maintain service. Typically during re-registration, it would be costly, in network resources, to reevaluate a user's redundancy mapping. These costs are at least partially due to the processing time required for the redundancy determination. The algorithm is a distributed computation where all session managers use the same algorithm and arrive at the same conclusions. Hence, the system should already be balanced without re-determining the set of session managers. However, when there is a failure of a session manager, the system may be unable to service a user due to loads being unevenly applied to the functioning session manager. In this failure situation, rebalancing the system may prevent a system overload by reassigning redundancy mappings among the functioning session managers. Further, a session manager may be added to the cluster and be able to alleviate loads on other session managers. Thus, a network configuration component can activate to rebalance the users data redundancy mappings when a session manager reaches a high capacity or due to other triggers. The rebalancing can occur during the users' periodic re-registration phase. Should another session manager be added into the cluster, the rebalancing can also occur during user re-registration time.

In the un-registration process, a user or communication device can be unregistered. Here, the primary session manager may receive an un-registration request. The primary session manager may remove knowledge about the user within the session manager cluster.

The embodiments provide several advantages. The system dynamically adapts the redundancy sets to the real-time environment rather than being statically defined by an administrator. The addition or removal of session managers requires no manual rebalancing work. The administrator does not need to provide explicit information about redundancy mappings for every user in the system. Further, the system helps eliminate the case where the mapping is inaccurately defined (i.e., when provisioned session manager locations do not properly reflect from where the user should receive service).

The term "user data" as used herein refers to any data or characteristic associated with a user or a communication endpoint used by a user. User data can include data about the user or the communication endpoint or data about how the user or the communication endpoint communicates. For example, user data can include a phone number, a login credential, an IP address, speed dial settings, contact lists (i.e., lists of people and phone numbers used by the user to call other parties), a physical location, etc.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc.

The term "session manager" as used herein refers to any hardware, software, or a combination of hardware and software operable to manage communications for one or more communication endpoints. In embodiments, the session manager is a computer system as described in conjunction with FIGS. 7 and 8. For example, the session manager may be a server that connects phone communications to other parties for a user.

The term "cluster" as used herein refers to any collection of two or more session managers that interact to provide communication services to two or more users. The cluster may span a large geographical area with the session managers physically dispersed.

The term "set of session managers" as used herein refers to a set of two or more session managers including at least a primary session manager and a secondary session manager. The set of session managers can be assigned to collect, store, retrieve, and manage user data associated with a user or a communication device.

The term "pairing rule" as used herein refers to any algorithm used to determine a set of session managers. The algorithm can include required inputs, different mathematical or logical functions, and produce one or more outputs, such as, a set of session managers.

The term "pairing factor" as used herein refers to one or more characteristics evaluated in a pairing rule to determine a set of session managers. The pairing factor can also include further algorithms evaluated to provide information to the pairing rule. Thus, the pairing factor provides a "nested" or hierarchical determination of information for determining a set of session managers.

The term "load factor" as used herein refers to a measure of load on a session manger. Load is the amount of work being done by the session manager. Load may be represented by one or more of the number of communications being handled by the session manager, the number of users being serviced by the session manager, the number of users having user data stored at the session manager, etc. The load factor can provide a quantitative measure of the load. The load factor may be represented as a number or a comparison to a benchmark, e.g., the load is above a certain amount.

The term "high capacity" as used herein refers to a representation of the load factor where the load is high or reaching a critical point where a failure or denial of service may occur. High capacity can be a benchmark, at which point, load above the benchmark is considered high.

The term "feature" as used herein refers to an option or a function provided to a user for communicating over the network. A feature can include such things as call waiting, conference calling, call forwarding, contact lists, etc.

The term "feature server" as used herein refers to hardware and/or software that provides features to the users. The feature server may be a separate system from the session manager or integrated with the session manager. If separate, the feature server can be a computer system as described in conjunction with FIGS. 7 and 8.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIG. 7 and FIG. 8. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" as used herein refers to any system, software, component, whether hardware or software, that stores data. The databases can be any type of databases described in conjunction with FIG. 7 and FIG. 8 and stored on any type of tangible computer readable medium.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible, non-transitory storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, individual aspects of the embodiments can be separately claimed.

BRIEF DESCRIPTION OF THE DRAWINGS

The present disclosure is described in conjunction with the appended figures.

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
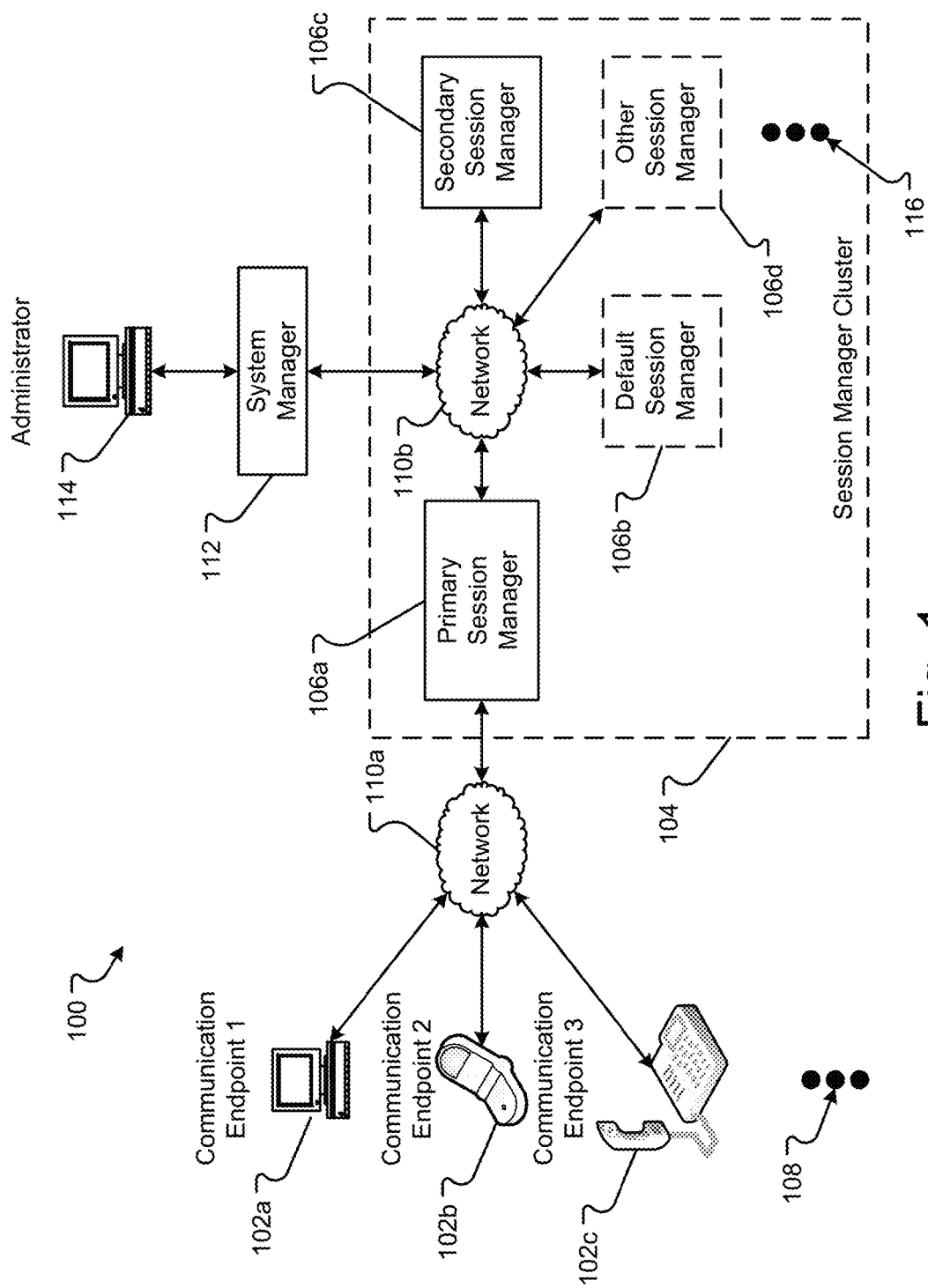
FIG. 1 is a block diagram of an embodiment of a system for the automatically determining user data redundancy.

An embodiment of a system 100 for automatically determining user data redundancy is shown in FIG. 1. The system 100 can include at least one communication endpoint, for example, communication endpoint 1 102a, communication endpoint 2 102b, and/or communication endpoint 3 102c. It should be noted that there may be more or fewer communication endpoints 102 than those shown in FIG. 1, as represented by ellipses 116. The communication endpoints 102 are in communication with a cluster 104 of session managers 106.

A cluster 104 includes two or more session managers 106 that communicate or interact to provide communication services to the communication endpoints 102. The cluster 104 can include a primary session manager 106a, a default session manager 106b, a secondary session manager 106c, and/or other session managers 106d. In embodiments, the default session manager 106b can become the primary session manager 106a. The cluster 104 can have more or fewer session managers than those shown in FIG. 1, as represented by ellipses 108.

The system 100 can also include a system manager system or computer 112 that is operable to interact with the session managers 106 and/or the communication endpoints 102 to configure the cluster 104 to provide service to the communication endpoints 102. The system manager 112 may also interact with an administrator work station or computer 114 that allows a human person, such as a network administrator, to configure the cluster 104 or other components of the system 100 using the system manager 112.

In embodiments, the communication endpoints 102 are operable to communicate through a network 110a. Further, the session managers 106 can communicate through a second or other network 110b. The communication endpoints 102 are operable to communicate or send registration requests to the cluster 104. One or more of the session managers 106, within the cluster 104, may receive the registration request. The registration request is a request from a communication endpoint 102 to become part of the system 100 and to have the session manager 106 store user data associated with the communication endpoint 102. Each communication endpoint 102 may be associated with two or more users, wherein each user has a set of user data. The user data is used by the system 100 to establish and manage communications between communication endpoints 102. Each session manager 106 may be in communication with at least one communication endpoint 102. An embodiment of a session manager is shown in FIG. 2.

Figure 2:
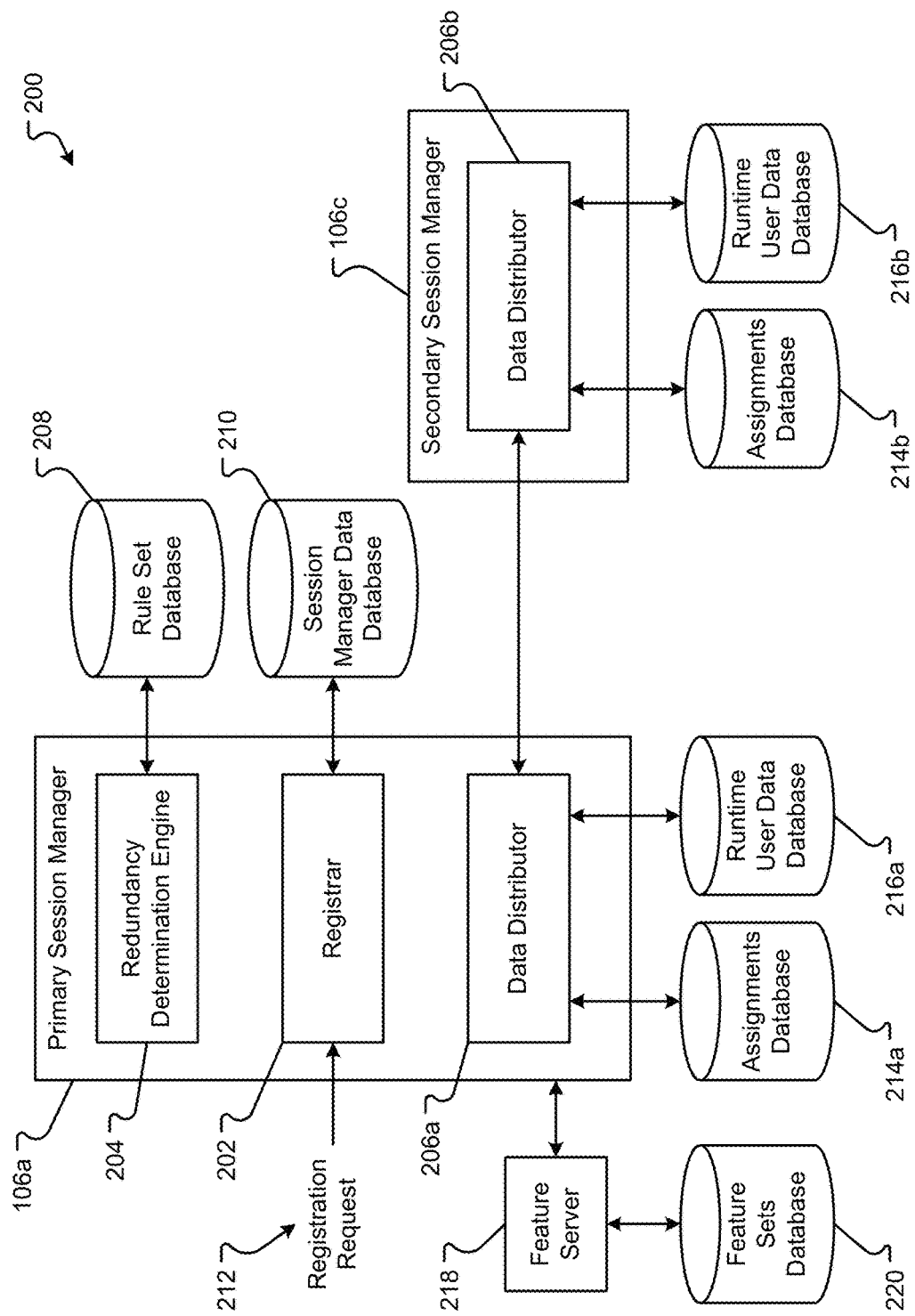
FIG. 2 is a block diagram of an embodiment of a computer system operable to determine redundancy based on one or more factors.

Embodiments of at least two session managers 106a and 106c that may be included in the cluster 104 are shown as part of system 200 displayed in FIG. 2. A primary session manager 106a and a secondary session manager 106c may be in communication with each other. A session manager 106 can be a computer system that includes a processor and memory as described in conjunction with FIGS. 7 and 8. Each component in the session manager 106 may be a software module that is executed by the processor, however, in other embodiments, the components may be hardware components that are embodied in an application specific integrated circuit (ASIC), a field programmable gate array (FPGA), or other type of hardware component. Hereinafter, the components within the session manager 106 will be described as being software executable modules, but the embodiments shall not be limited to such software components. The session manager 106 can include a registrar component 202, a redundancy determination engine 204, and a data distributor 206.

The registrar 202 can receive the registration request 212 from one or more communication endpoints 102. The registration request 212 establishes a new communication endpoint 102 and registers any of one or more users that may use the communication endpoint 102. In embodiments, the registrar 212 receives session initiation protocol (SIP) messages. For example, the registration request 212 can be a SIP registration request. The registrar 202 is also operable to provide information back to the one or more communication endpoints 102. For example, the registrar 202 may provide the session manager information to the communication endpoint 102 to enable the communication endpoint 102 to permanently register with the cluster 104. The registrar 202 can also communicate with the redundancy determination engine 204 or the data distributor 206 to exchange information during the registration process or during other processes involved in establishing communications between communication endpoints 102.

A redundancy determination engine 204 can determine the redundancy sets of session managers 106 for a communication endpoint 102. The redundancy determination engine 204 can communicate with the rule set database 208 and/or a session manager data database 210. The redundancy determination engine 204 may be operable to retrieve a pairing rule from the rule set database 208 that is associated with the registration request 212 received from the registrar 202. A pairing rule can be a user-configurable rule that establishes what factors are considered in determining which two or more session managers in the cluster 104 should store the user data. The pairing rule can include one or more pairing factors that identify and establish the information, factors, and/or characteristics to consider in determining the set of session managers. Further, the pairing rule can include an algorithm that identifies how to weight each pairing factor and/or how to calculate or score the suitability of each session manager 106 based on the scored pairing factors. The first and second most suitable session managers 106 can become the primary session manager 106a and secondary session manager 106b, respectively. Some pairing factors may include the location of the communication endpoint 102, the location of one or more session managers 106 within the cluster 104, the relative proximity of the session manager 106 to the communication endpoint 102 based on the determined locations, a load factor for a session manager, a set of features that may be provided by a feature server 218 associated with the session manager 106, the location of the feature server 218, or other factors.

The load factor can be the number of users currently using the session manager 106 as a primary session manager 106a or secondary session manager 106b. In other embodiments, the load factor may be some type of determination of communications handled or managed per period of time. There are several known methods for determining load on a server which may be employed by and are contemplated by the present embodiments.

The information about the session managers 106 within the cluster 104 can be stored in the session manager data database 210. An example of information stored within the session manager data database 210 is shown in FIG. 3B. Each session manager 106 can store data, for the other session managers 106 within the cluster 104, within the session manager data database 210. Thus, in determining the set of session managers, the redundancy determination engine 204 is operable to retrieve information about two or more session managers 106 in the cluster 104 from the session manager data database 210.

Based on the pairing rule, the redundancy determination engine 204 can extract and determine a score for each pairing factor associated with the pairing rule. The algorithm within the pairing rule can be applied to the pairing factors to determine a suitability score for each session manager 106. Based on the application of the pairing rule to the pairing factors, the redundancy determination engine 204 can determine the set of session managers suitable for each communication endpoint 102. This set of session managers may be provided by the redundancy determination engine 204 to the registrar 202 and/or the data distributor 206. As such, the registrar 202 can receive the set of session managers from the redundancy determination engine 204 to provide to the communication endpoint 102.

The data distributor 206 is a component that is in communication with one or more other session managers 106 within the cluster 104. The data distributor 206 can provide information between session managers 106. For example, the data distributor 206 may receive the session manager data that is stored within the session manager data database 210. Further, the data distributor 206 can provide the session manager set information for registered users between the primary session manager 106a and a secondary session manager 106c. Further, the data distributor 206 may broadcast the session manager set information to all session managers 106 or at least one other session manager 106 within the cluster 104.

These session manager assignments for each user can be stored in an assignments database 214. Each session manager 106 may include an assignments database 214 to store information about all communication endpoints 102. Further, the data distributor 206 may also store or read run-time user data that may be provided in a run-time user database 216. The run-time user database 216 can be stored within memory and may include other types of stored systems or memory structures used to store run-time data. The run-time user data stored within the run-time user data database 216 includes the information about the user using the communication endpoint 102 and any data necessary to effect a communication between two or more communication endpoints 102. The data distributor 206 can communicate this run-time user data between session managers.

In embodiments, a session manager 106 can have one or more feature servers 218 that are associated with the session manager 106. The feature server 218 is operable to provide features to the communication endpoints 102. A feature can be any type of configurable or standard operating function that a communication endpoint 102 may use during a communication. For example, a feature may include call waiting, 3-way calling, call-forwarding, contact lists, speed dial assignments, or other information that may be associated with either a user or communication endpoint 102. These features associated with the user communication endpoints 102 can be stored in a feature sets database 220 and accessed by the feature server 218. The information about the feature server 218 and the feature set database 220 can be used by the redundancy determination engine 204 to determine whether a session manager 106 is suitable for a communication endpoint 102. For example, if a user desires a certain feature, the redundancy determination engine 204 will attempt to pair a session manager 106 having an associated feature server 218 that can provide that feature.

Figure 3A:
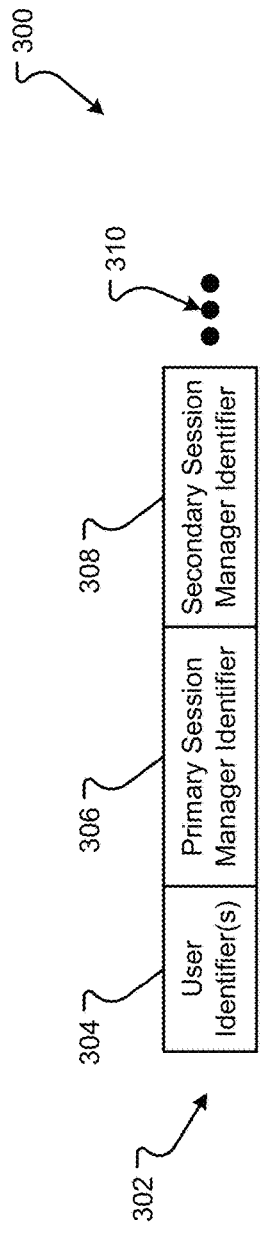
FIGS. 3A-3C are embodiments of data structures operable to aide in determining user data redundancy.
Figure 3B:
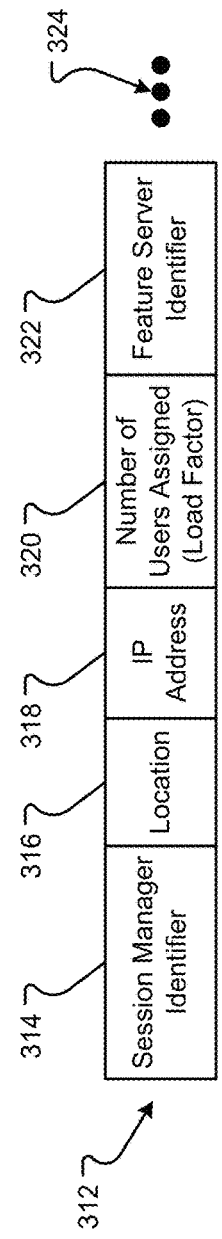
Figure 3C:
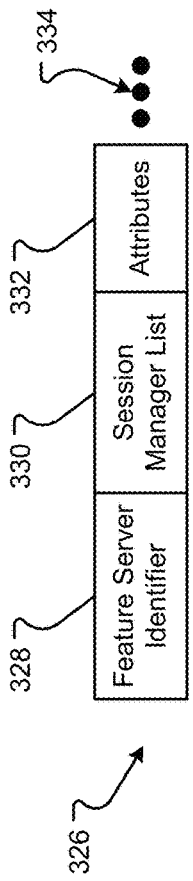

A set of data structures 300 that may be stored within one or more databases described herein are shown in FIGS. 3A, 3B and 3C. Each data structure may have one or more sections that store an item of data. A section may include, depending on the type of database, an attribute of an object, a data field, or other types of data storage sections included in one or more types of databases. Each data structure may be stored in a type of database that can include relational databases, flat file databases, object-oriented databases, or other types of databases. Further, the data structures 300 can also be stored in memory or memory structures that may be used in either run-time or in initializing a communication. Each data structure shall be explained in turn. The data within each data section will be described.

A session manager set assignment data structure 302 is shown in FIG. 3A. The session manager set assignment data structure 302 may store a single session manager set assignment for a single communication endpoint 102 or user. One or more session manager set assignment data structure 302 can be stored in the assignments database 214. The session manager set assignment data structure 302 can include user identifier data section, a primary session manager identifier section, a secondary session manager identifier section, or one or more other sections as represented by ellipses 310. One or more user identifiers 304 can include a user log-in name, a globally unique identifier (GUID), a communication endpoint phone number, a communication endpoint IP address, or other information about either a user of an communication endpoint 102 or a communication endpoint 102. The user identifier field may store two or more user identifiers.

A primary/secondary session manager identifier 306/308 can be an IP address, a GUID, or other identifier for the session manager 106. The primary session manager identifier 306 can identify the primary session manager 106a of the set of session managers while the secondary session manager identifier 308 can identify the secondary session manager 106c in the set of session managers. The session manager set assignment data structure 302 associates the user and/or the communication endpoint 102 with the set of session managers, which includes the primary session manager 106a and the secondary session manager 106c. The session manager set assignment data structure 302 can be stored and communicated between session managers 106, by the data distributor 206, and stored in the assignments database 214.

A session manager information data structure 312 is shown in FIG. 3B. The session manager information data structure 312 can include sections to store a session manager identifier 314, a location 316, one or more IP addresses 318, a number of users assigned and/or a load factor 320, and/or a feature server identifier 322. The session manager information data structure 312 can include more or fewer data sections than those shown in FIG. 3B, as represented by the ellipses 324. A session manager identifier 314 can be a GUID or other canonical name for the session manager 106. The session manager identifier 314 can identify the session manager 106 uniquely amongst all session managers 106 within the cluster 104.

A location 316 can include a physical location for the session manager 106. For example, the location 316 may be a zip code, a city and state, a latitude/longitude, or some other physical location data. This location data 316 can be compared to location information for a communication endpoint 102 or a user using a communication endpoint 102 to determine the proximity of the session manager 106 to the communication endpoint 102. In alternative embodiments, the location 316 may also include a location within a computer network for the session manager 106. Thus, the location 316 can identify a location within a tree structure or other type of network diagram that identifies where the session manager 106 is in a network that can be compared to the position of a communication endpoint 102 within the network.

An IP address 318 can be the IP address for the session manager 106. The IP address field can include two or more IP addresses 318. In embodiments, the session manager identifier 314 and the IP address 318 are the same.

The number of users assigned 320 can be an indication of the load on the session manager 106. The number of users assigned 320 may include all users for which the session manager 106 is storing user data and/or all users currently interacting with, using, or communicating with the session manager 106 to effect communication between communication endpoints 106. Rather than showing the number of users assigned, a load factor 320 may be provided in this field. A load factor can be some computed load on the session manager 106. The load factor can be a computation of the number of communications or users using the session manager 106 compared to a threshold or some other type of calculation.

The feature server identifier 322 can include the IP address or other identifier for the feature server or feature servers 218 that may be associated with the session manager 106. The feature server 218 can provide features to users or communication endpoints 102 that interact with the session manager 106. The feature server identifier 322 can also include a pointer to a feature server data structure 326 that includes information about the feature server 218.

The feature server data structure 326 can include fields for storing a feature server identifier 328, a session manager list 330, and/or one or more attributes 332. The feature server data structure 326 can include more or fewer fields then those shown in FIG. 3C, as represented by ellipses 334. A feature server identifier 328 can be a GUID, an IP address, or other identifier for the feature server 218. The feature server identifier 328 can be associated with one or more session managers 106. Thus, the feature server data structure 326 can include one or more session manager identifiers 314, as stored in the session manager information data structure 312, in a session manager list 330. The session manager list 330 can include the one or more session manager identifiers 314 for the one or more session managers that are associated with the feature server 218.

The feature server data structure 326 can also include one or more attributes 332. An attribute can be a feature or feature set that the feature server 218 can provide. For example, the feature server sets within the feature server sets database 220 can be included within the attributes 332. For example, the attributes 332 can include whether the feature server 218 can provide conference calling, 3-way calling, call forwarding, call waiting, contacts lists, speed dial associations, or other information about the communication endpoints 102 or the user features.

Figure 4:
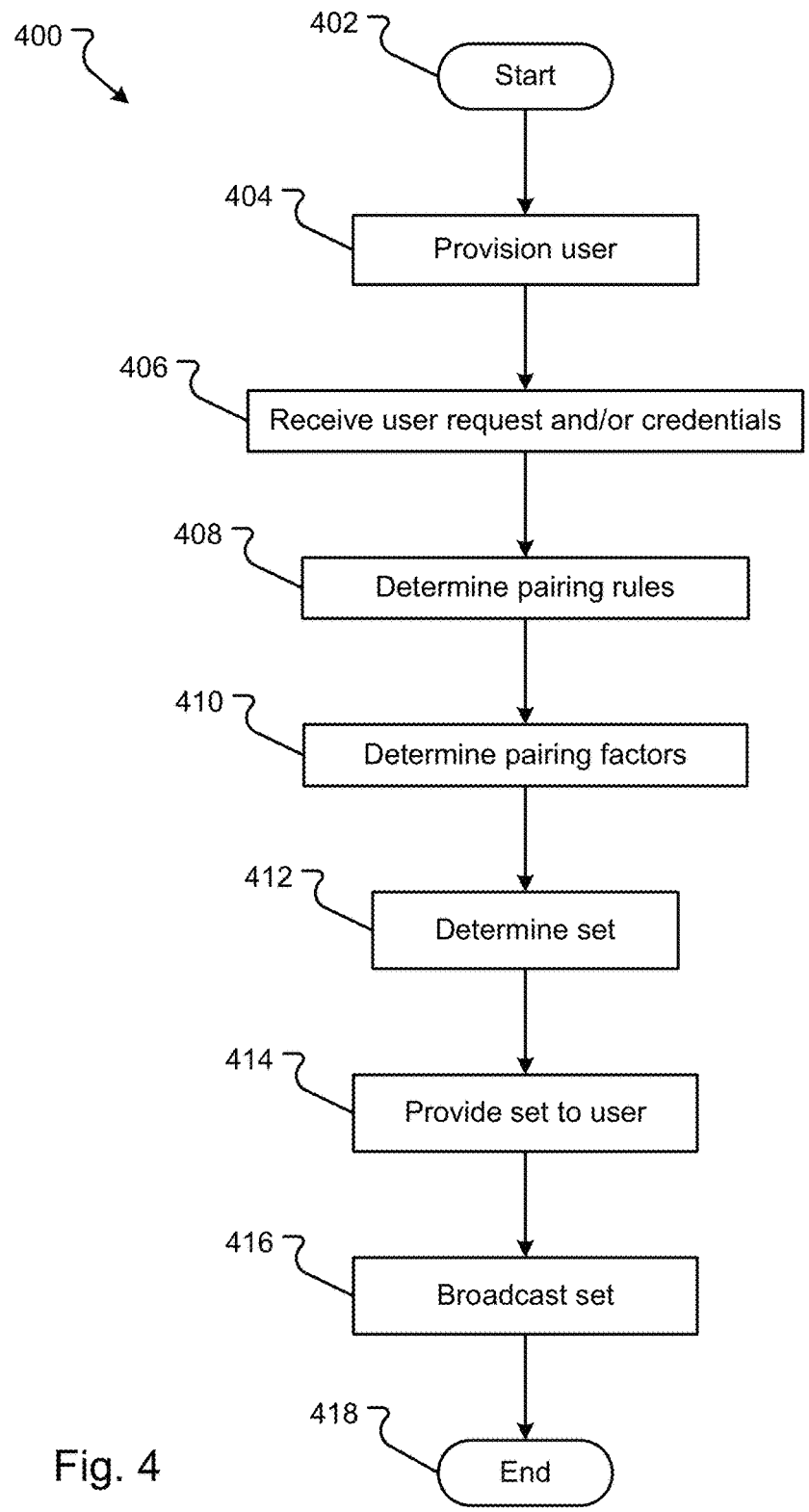
FIG. 4 is a flow diagram of an embodiment of a process for automatically determining user data redundancy.

An embodiment for method 400 for automatically determining user data redundancy is shown in FIG. 4. Generally, the method 400 begins with a start operation 402 and terminates with an end operation 418. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3C.

A user is provisioned, in step 404. To provision a user, an administrator 114 interacts with a system manager 112 to create an initial profile for a user within the communication system 100. The provisioning of the user can establish a profile and associate a communication endpoint(s) 102 with the user. Also, the provision of the user may include establishing a user log-in and password and associating the user credentials with a communication endpoint identifier, for example, a communication endpoint telephone number, IP address, etc. This provisioning information may be stored at the communication endpoint 102 until the communication endpoint 102 registers with the session manager 106.

A default session manager 106b receives a registration request 212 from a communication endpoint 102, in step 406. The user request can be a SIP registration request and include the logon credentials that were created during the provisioning of the user. Further, the request may also include one or more items of information about the communication endpoint 102, for example, the communication endpoint identifier, IP address, physical location, and/or other information associated with the communication endpoint 102. In embodiments, the communication endpoint 102 is an IP enabled telephone that communicates with the session manager 106 using SIP. A registrar 202 can receive the registration request 212 for the default session manager 106b.

The registrar 202 can send the registration request to a redundancy determination engine 204. The redundancy determination engine 204 can determine a pairing rule by accessing a rule set database 208 and retrieving a pairing rule from the rule set database 208, in step 408. There may be one or more pairing rules stored within the rule set database 208. The redundancy determination engine 204 can determine the appropriate rule by the type of registration request 212 or by information included within the registration request 212. For example, the type of communication endpoint 102 may determine the type of pairing rule used to determine the user data redundancy. The redundancy determination engine 204 can then read information within the pairing rule to determine one or more pairing factors, in step 410. A pairing factor can be a consideration for the redundancy determination engine 204 in determining the set of session managers.

To determine the pairing factors the redundancy determination engine 204 may access one or more items of information stored either in the session manager data database 210 or in one or more other data sources. For example, the redundancy determination engine 204, of the default session manager 106b, can determine the location of the communication endpoint 102 from the registration request 212 or from other information stored in a database. Further, the redundancy determination engine 204 can determine the load factor or number of users assigned to a session manager 106 from the session manager data in the session manager data database 210. Other information may also be collected by the redundancy determination engine 204. The redundancy determination engine 204 may then score or weight each pairing factor according to one or more algorithms provided in the pairing rule.

The redundancy determination engine 204, of the default session manager 106b, may then determine the set of session managers, in step 412. The redundancy determination engine 204 can apply an algorithm provided in the pairing rule to the one or more weighted or scored pairing factors. Thus, based on information, such as the location of the communication endpoint 102 or the load factor(s) of the session manager(s), the redundancy determination engine 204 can determine the most suitable session managers 106 to store the user data for the communication endpoint 102. The most suitable session manager 106 may be designated the primary session manager 106a and the second most suitable session manager 106 may be designated the secondary session manager 106c. The pairing rule can be user-configurable so that the determination of set of session managers can be configured to include other information or to assess suitability in a way that is modified and focused on the needs of the organization administrating the communication network 100.

The redundancy determination engine 204 can provide the set of session managers to the registrar 202. The registrar 202 can then create the session manager set assignment data structure 302 that includes the user identifier 304, the primary session manager identifier 306 and the secondary session manager identifier 308. This session manager set assignment data structure 302 can be communicated from the registrar 202 to the data distributor 206. The data distributor 206 can then store the session manager set assignment data structure 302 in the assignments database 214.

The registrar 202 can also provide the session manager set information to the communication endpoint 102, in step 414. The registrar 202 may send a SIP 301 message in response to the SIP registration request 212. The SIP 301 message can include the session managers set information. For example, the SIP 301 message may include the session manager set assignment data structure 302 that associates the user and/or communication endpoint 102 with the set of session managers.

Upon receiving the SIP 301 message, the communication endpoint 102 can determine whether to register with the primary session manager 106a. In embodiments, the default session manager 106b may be determined to be the best session manager and can accept the registration request and send the acceptance to the communication endpoint 102 in the SIP 301 message. Thus, the default session manager 106b becomes the primary session manager 106a. In other embodiments, another session manager 106d is determined to be the most suitable session manager to be the primary session manager 106a. Thus the communication endpoint 102, upon receiving the SIP 301 message, sends a second registration request to the primary session manager 106a. Further, the communication endpoint 102 can also send another registration request to the secondary session manager 106c.

The data distributor 206 can broadcast the session managers set information to one or other session managers 106, in step 416. Thus, data distributor 206a, of the default session manager 106b, can send the session manager set assignment data structure 302 to a second data distributor 206b associated with the secondary session manager 106c. In other embodiments, the data distributor 206a sends the session manager set assignment data structure 302 to each session manager 106 within the cluster 104. The secondary session manager 106c can then store the set of session managers in the assignments database 214b.

Upon receiving the registration request from the communication endpoint 102, the primary session manager 106a or the secondary session manager 106c will automatically accept the registration request because the set of session managers assignment data structure 302 identified the primary session manager 106a and the secondary session manager 106c as the appropriate set of session managers for the communication endpoint 102. This notification process eliminates the set of session managers from re-evaluating the request to determine a set of session managers.

In further embodiments, the redundancy determination engine 204 can also determine a set of features required by a user of the communication endpoint 102. The set of features may be included in the registration request or may be provisioned in step 404. The redundancy determination engine 204 can interact with one or more feature servers 218 or obtain information from the session manager data database 210 about the features offered by each feature server 218 associated with each session manager 106 in the cluster 104. These sets of features offered may be included in feature sets database 220. The redundancy determination engine 204 can extract the features offered by each feature server 218 and compare the offered features to the required features. The redundancy determination engine 204 can eliminate session managers 106 that do not have a feature server 218 associated with the session manager 106 that can offer the appropriate feature set.

In other embodiments, the redundancy determination engine 204 can score each session manager 106 based on the number of features offered or likelihood of providing all the needed features to the communication endpoint 102. Based on the information about the set of features required by the user and the set of features offered by the feature servers 218 associated with the session managers 106, the redundancy determination engine 204 can include the feature server factors into the pairing rule calculation. In further embodiments, the redundancy determination engine 204 can also determine a location for the feature server and factor the location of the feature server 218 into the calculation of the set of session managers.

Figure 5:
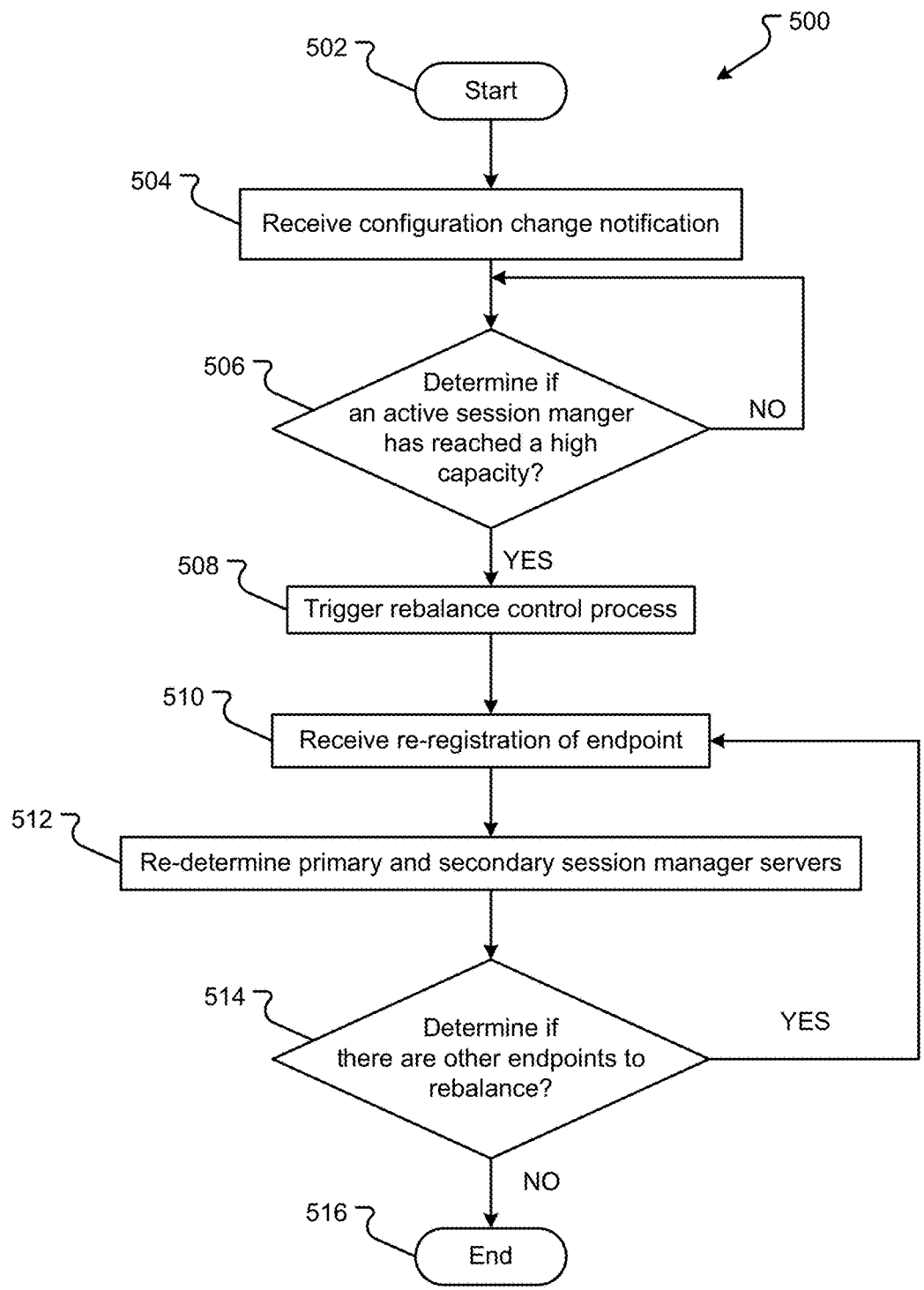
FIG. 5 is another flow diagram of an embodiment of a process for rebalancing user data redundancy in response to a network configuration change.

An embodiment of a method 500 for rebalancing session manager set assignments across a cluster 104 is shown in FIG. 5. Generally, the method 500 begins with a start operation 502 and terminates with an end operation 516. While a general order for the steps of the method 500 are shown in FIG. 5, the method 500 can include more or fewer steps or the order of the steps may be arranged differently than the method 500 shown in FIG. 5. The method 500 can be a set of computer-executable instructions executed by a computer system or processor and/or encoded or stored on a computer readable medium. Hereinafter, the method 500 shall be explained with reference to the systems, components, modules, data structures, user interfaces, etc. described in conjunction with FIGS. 1-3C.

One or more session managers 106 can receive a configuration change notification to the cluster 104, in step 504. The configuration change can be the failure of a session manager 106, the addition of one or more session managers 106, or some other type of configuration change. The notification can be received in a manner known in the art such as the absence of a pole message that is periodically received, the failure to respond to a message, or some other type of determination of a configuration change.

The session managers 106 in the cluster 104 can also determine if any active session manager 106 within the cluster 104 has reached a high capacity, in step 506. The determination of whether an active session manager 106 has reached a high capacity can be made in response to a configuration change or independently to determine if a rebalancing is to be done. The session manager 106 can determine whether an active session manager 106 has reached a high capacity by comparing a load factor or the number of users currently assigned to the session manager 320 as stored in the session manager information data structure 312 to a threshold to determine if the load factor crosses the threshold. If the load factor is higher than the threshold and the session manager has reached a high capacity, then step 506 proceeds YES to step 508. However, if the load factor and/or number of users is not above the threshold and the session manager is not at a high capacity, step 506 returns NO to continue checking load factors at some future point in step 506.

If the configuration change and/or an active session manager 106 have received a high capacity, the session manager 106 can trigger a rebalance control process, in step 508. The rebalance control process can reset each session manager 106 within the cluster to re-determine set of session managers for every communication endpoint 102 as those communication endpoints 102 re-register with the session managers 106.

In the SIP environment, communication endpoints 102 re-register periodically with session managers 106. Thus as the re-registration occurs, if the rebalance is triggered, the session manager 106 can re-determine the best set of session managers for the communication endpoint 102. Thus, the session manager 106 can take into consideration the configuration change or the high capacity of any one of the session managers 106 in re-balancing which communication endpoints 102 register with which session managers 106. In embodiments, the re-balance control process requires that the re-set signal of the set of session managers is broadcast to all session managers 106 within the cluster 104. A flag or other data marker may be set within each session manager 106 to re-balance the set of session managers as re-registrations are received from communication endpoints. As each session manager 106 uses the same algorithms, each session manager 106 will reach determine the same set of session managers.

Each session manager 106 may receive a re-registration request from a communication endpoint 102 thereinafter, in step 510. The communication endpoints 102 can attempt to re-register with their primary session manager 106a or 106b. Upon receiving the re-registration, the primary session manager 106a or 106b will determine a new set of session managers as explained in conjunction with FIG. 4. The determination of the new set of session managers can be provided back to the communication endpoint 102, which may then have to re-register with a different session manager 106, and may be broadcast to the other session managers 106 within the cluster 104. Thus, each session manager 106 that receives a re-registration request re-determines the primary and secondary session managers in the set of session managers, in step 512.

In embodiments, the session manager may determine if there are other communication endpoints 102 to re-balance, in step 514. The session manager 106 may record which communication endpoints 102 communicated with the session manager 106 to re-register. The session manager 106 may then access the assignments database 214 to determine if any communication endpoint 102 currently assigned to the session manager 106 has not attempted to re-register. If other communication endpoints 102 do need to be re-registered, step 514 proceeds YES to step 510. However if all communication endpoints have re-registered and the rebalance process is completed, step 514 proceeds NO to the end operation 516.

Figure 6:
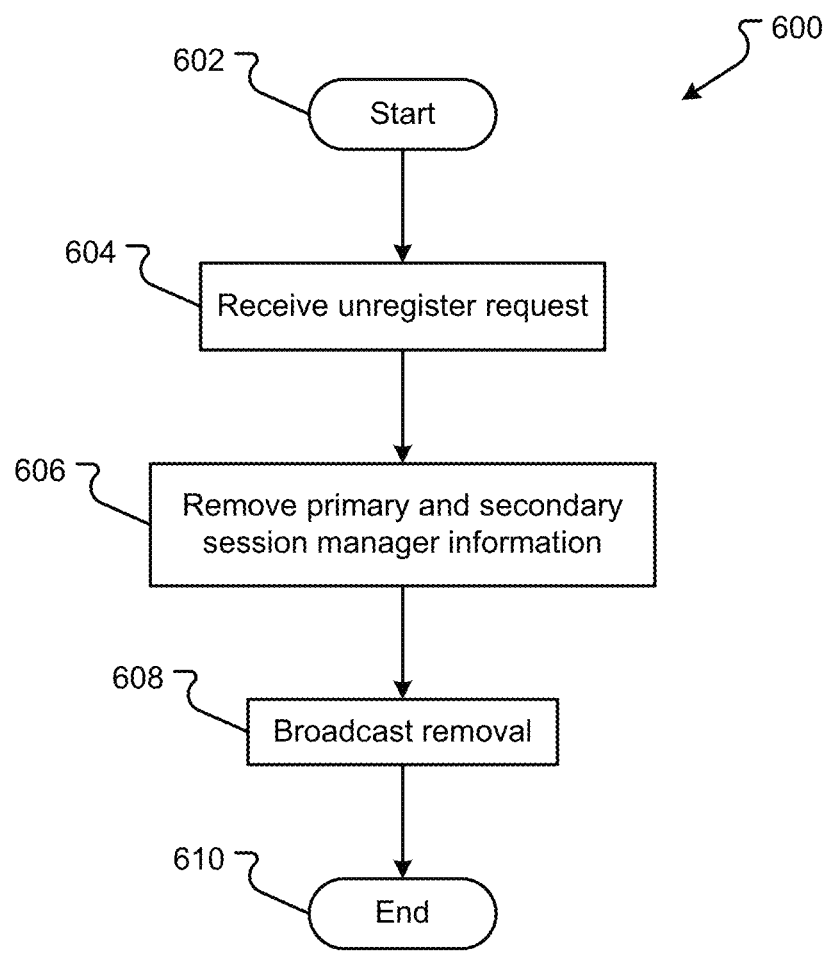
FIG. 6 is another flow diagram of an embodiment of a process for unregistering a user.

An embodiment of a method 600 to unregister a communication endpoint 102 is shown in FIG. 6. Generally, the method 600 begins with a start operation 602 and terminates with an end operation 610. While a general order for the steps of the method 600 are shown in FIG. 6, the method 600 can include more or fewer steps or the order of the steps may be arranged differently than the method 600 shown in FIG. 6. The method 600 can be a set of computer-executable instructions executed by a computer system or processor and/or encoded or stored on a computer readable medium. Hereinafter, the method 600 shall be explained with reference to the systems, components, modules, data structures, user interfaces, etc. described in conjunction with FIGS. 1-3C.

A session manager 106 receives an unregister request from a communication endpoint 102, in step 604. An unregister request is a request to eliminate or delete the registration of the communication endpoint 102 or user with the set of session managers. The unregister request can be triggered by an input from the system manager 112 or triggered independently from the communication endpoint 102 by the disconnection or relocation of the communication endpoint 102.

Upon receiving the unregister request, the primary session manager 106a or 106b removes the primary and secondary session manager information, in step 606. In removing the session manager information, the primary session manager 106a can delete the session manager set assignment data structure 302 from the assignments database 214. For example, the registrar 202 can send the unregister request information to the data distributor 206, which deletes the set of session managers assignments data structure 302 from the assignment database 214.

The data distributor 206 can further broadcast the removal of the assignment set, in step 608. Thus the data distributor 206a broadcasts the removal of the assignment set to one or more other session managers 106 so that the data distributor 206b and the secondary session manager 106c and/or other session managers 106d can delete the set of session managers assignment data structure 302 from the assignment database 214b.

Figure 7:
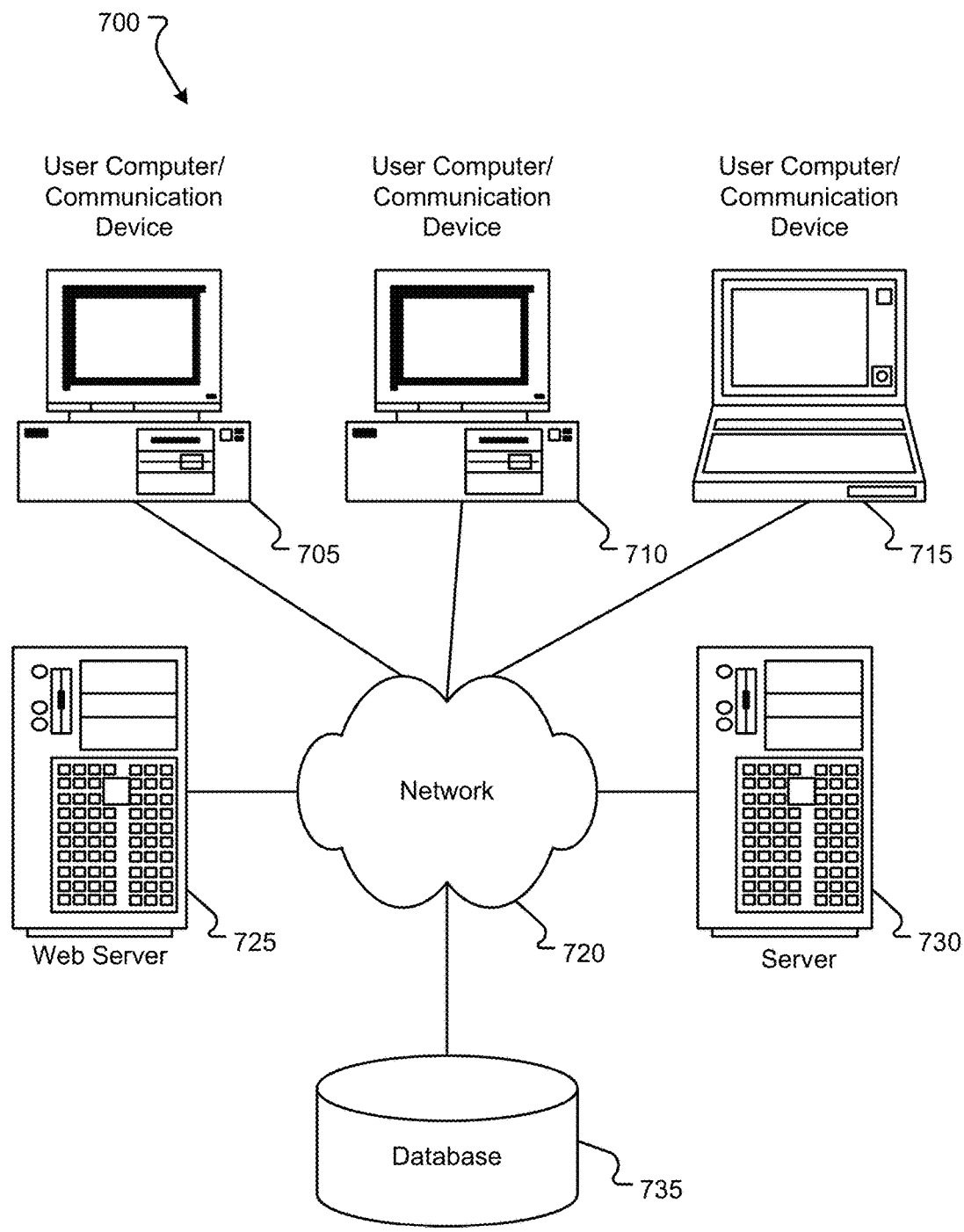
FIG. 7 is a block diagram of an embodiment of a computing environment operable to execute the embodiments described herein.

FIG. 7 illustrates a block diagram of a computing environment 700 that may function as system or environment for the embodiments described herein. The system 700 includes one or more user computers 705, 710, and 715. The user computers 705, 710, and 715 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary system 700 is shown with three user computers, any number of user computers may be supported.

System 700 further includes a network 720. The network 720 can be any type of network familiar to those skilled in the art that can support data communications using any of a variety of commercially-available protocols, including, without limitation, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 700 may also include one or more server computers 725, 730. One server may be a web server 725, which may be used to process requests for web pages or other electronic documents from user computers 705, 710, and 715. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 5 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as servers or other systems described herein.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands. Database 735 may be the same or similar to the database used herein.

Figure 8:
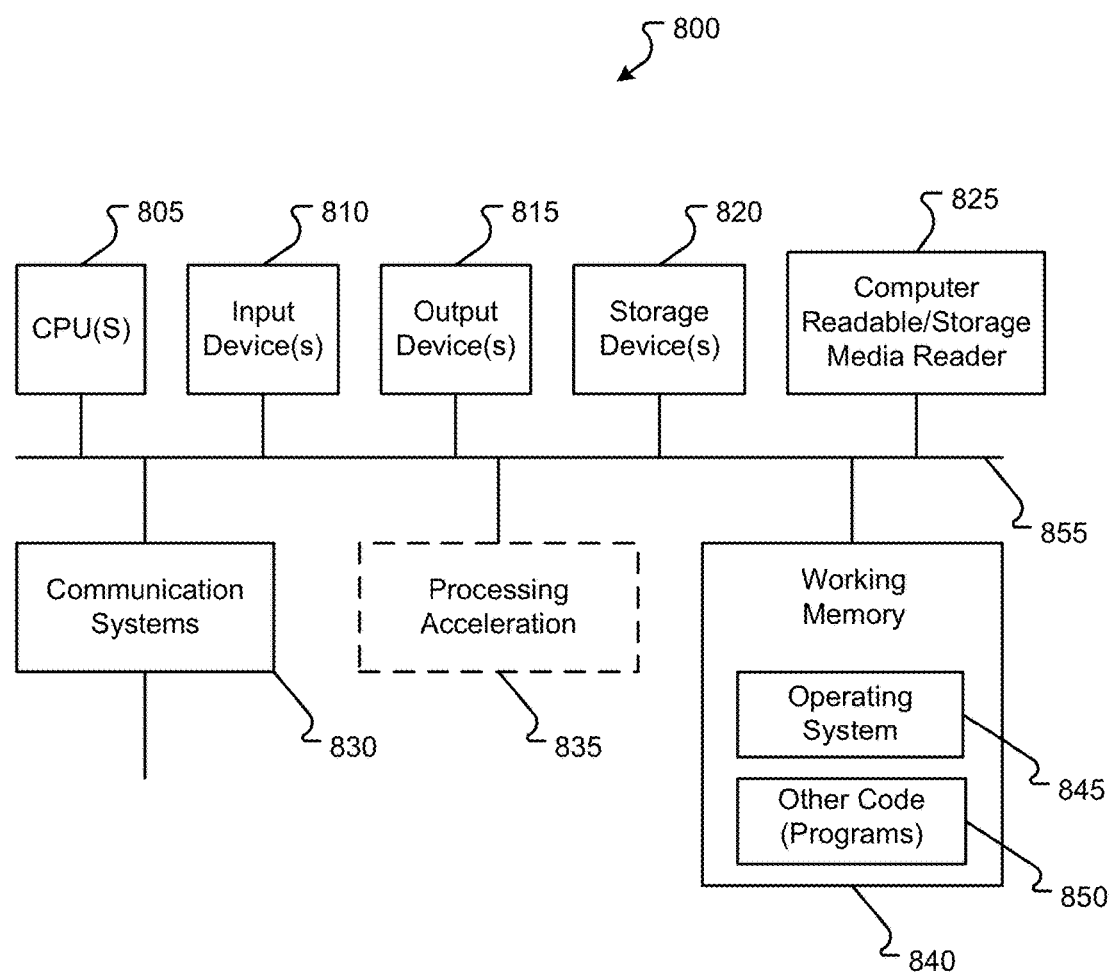
FIG. 8 is a block diagram of an embodiment of a computer or computing system environment operable to execute as the one or more devices described herein.

FIG. 8 illustrates one embodiment of a computer system 800 upon which servers or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage device 820. By way of example, storage device(s) 820 may be disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the servers or devices described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A method for automatically determining user data redundancy, comprising:
   receiving, by a default session manager, a Session Initiation Protocol (SIP) registration request from an Internet Protocol-enabled (IP-enabled) phone;
   the default session manager determining a location of the IP-enabled phone;
   the default session manager determining a load factor on two or more session managers in a cluster of session managers;
   the default session manager determining a location of the two or more session managers within the cluster of session managers;
   based on the location of the IP-enabled phone, the load factor on the two or more session managers, and the location of the two or more session managers within the cluster of session managers, automatically determining a set of session managers, which set includes a primary session manager and a secondary session manager, that will manage user data for the IP-enabled phone, wherein the primary session manager is different from the default session manager;

the default session manager sending a SIP message to the IP-enabled phone, wherein the SIP message includes information about the set of session managers;

the default session manager broadcasting information about the set of session managers and the IP-enabled phone to at least one other session manager in the cluster;

the set of session managers thereafter managing user data for the IP-enabled phone;

the primary session manager receiving an unregister request;

based on receiving the unregister request, the primary session manager removing the set of session managers information;

the primary session manager broadcasting the removal of the session manager set information to the cluster; and in response to a SIP 301 message containing the session manager set information, the primary session manager receiving a second registration message from the IP-enabled phone and the secondary session manager receiving a third registration message from the IP-enabled phone.

2. The method as defined in claim 1, wherein the set of session managers includes the default session manager, the method further comprising the default session manager accepting the registration request from the IP-enabled phone and becoming the primary session manager.

3. The method as defined in claim 1, wherein the IP-enabled phone is associated with a user.

4. The method as defined in claim 3, further comprising:
the default session manager determining a set of features required by the user; and
based further on the set of features required by the user, the default session manager determining the set of session managers.

5. The method as defined in claim 4, wherein a feature server further provides the set of features to the IP-enabled phone.

6. The method as defined in claim 5, further comprising:
the default session manager determining a location for the feature server;
the default session manager determining an association of the feature server with a session manager; and
based further on the location for the feature server or the association of the feature server with a session manager, the default session manager determining the set of session managers.

7. The method as defined in claim 1, further comprising:
the primary session manager receiving a configuration change to the cluster;
based on the configuration change, the primary session manager determining if an active session manager has reached a high capacity;
when an active session manager has reached a high capacity, triggering a rebalance control process;
receiving a re-registration from the IP-enabled phone; and
upon the triggering of the rebalance control process and receiving the re-registration from the IP-enabled phone, re-determining a session pair for the IP-enabled phone.

8. The method as defined in claim 7, wherein the configuration change is one of a failure of a session manager in the cluster or an addition of a session manager to the cluster.

9. A communication network comprising:
a default session manger that:
receives a Session Initiation Protocol (SIP) registration request from a communication endpoint;
determines a location of the communication endpoint;
determines a load factor on two or more session managers in a cluster of session managers;
determined a location of the two or more session managers within the cluster of session managers;
based on the location of the communication endpoint, the load factor on the two or more session managers, and the location of the two or more session managers within the cluster of session managers, automatically determines a set of session managers, which set includes a primary session manager and a secondary session manager that will manage user data for the communication endpoint, wherein the primary session manager is different from the default session manager;
sends a SIP message to the communication endpoint, wherein the SIP message includes information about the set of session managers; and
broadcasts information about the set of session managers and the communication endpoint to at least one other session manager in the cluster, the set of session managers thereafter managing user data for the communication endpoint the primary session manager that:
receives an unregister request;
removes the set of session managers information based on receiving the unregister request;
broadcasts the removal of the session manager set information to the cluster; and
receives a second registration message from the communication endpoint in response to a SIP 301 message containing the session manager set information, and
wherein the secondary session manager receives a third registration message from the communication endpoint.

10. The communication network as defined in claim 9, wherein the communication endpoint is one of a cellular telephone, a soft client software component, a desktop telephone, or an Internet Protocol-enabled phone.

11. The communication network as defined in claim 9, wherein a pairing rule provides a user-configurable algorithm to score one or more pairing factors and provides a suitability algorithm to score each session manager, based on the scored pairing factors, as to the suitability of each session manager to function as a primary or secondary session manager for the communication endpoint.

12. The communication network as defined in claim 11, wherein the pairing factors include one or more of a group consisting of: a load factor for the session manager, a set of features provided by a feature server, or the location of the feature server.

13. The communication network as defined in claim 9, further comprising an assignments database operable to store the set of session managers for the communication endpoint.

14. The communication network as defined in claim 9, wherein the set of session managers includes the default session manager, and further comprising the default session manager accepting the registration request from the IP-enabled phone and becoming the primary session manager.

15. The communication network as defined in claim 9, wherein the communication endpoint is associated with a user.

16. The communication network as defined in claim 15, wherein the default session manager determines a set of features required by the user and determines the set of session managers based further on the set of features required by the user.

17. The communication network as defined in claim 16, wherein a feature server further provides the set of features to the communication endpoint.

18. The communication network as defined in claim 9, where the default session manager:
 determines a location for the feature server;
 determines an association of the feature server with a session manager; and
 determines the set of session managers based further on the location for the feature server or the association of the feature server with a session manager.

19. The communication network as defined in claim 9, wherein the primary session manager:
 receives a configuration change to the cluster;
 determines if an active session manager has reached a high capacity based on the configuration change, wherein when the active session manager has reached a high capacity, triggering a rebalance control process;
 receives a re-registration from the communication endpoint; and
 re-determines a session pair for the communication endpoint upon the triggering of the rebalance control process; and
 receives the re-registration from the communication endpoint.

* * * * *